United States Patent
Kim-Santos et al.

(10) Patent No.: US 12,359,087 B2
(45) Date of Patent: Jul. 15, 2025

(54) ZWITTERIONIC-DOPED HYDROGELS AND ANTI-FOGGING COATINGS COMPRISING THE SAME

(71) Applicant: ACTNANO, Cambridge, MA (US)

(72) Inventors: Peter Kim-Santos, Cambridge, MA (US); Sruti Balasubramanian, Quincy, MA (US); Justin A Kleingartner, Boston, MA (US)

(73) Assignee: ACTNANO, INC., Malden, MA (US)

( * ) Notice: Subject to any disclaimer, the term of this patent is extended or adjusted under 35 U.S.C. 154(b) by 42 days.

(21) Appl. No.: 17/929,389

(22) Filed: Sep. 2, 2022

(65) Prior Publication Data

US 2023/0212416 A1  Jul. 6, 2023

Related U.S. Application Data

(60) Provisional application No. 63/240,629, filed on Sep. 3, 2021.

(51) Int. Cl.
| | | |
|---|---|---|
| *C09D 133/10* | (2006.01) | |
| *C08J 3/075* | (2006.01) | |
| *C08J 7/054* | (2020.01) | |
| *C08J 7/056* | (2020.01) | |
| *C08K 5/00* | (2006.01) | |
| *C08L 33/10* | (2006.01) | |

(52) U.S. Cl.
CPC ............ *C09D 133/10* (2013.01); *C08J 3/075* (2013.01); *C08J 7/054* (2020.01); *C08J 7/056* (2020.01); *C08K 5/00* (2013.01); *C08L 33/10* (2013.01); *C08L 2201/10* (2013.01)

(58) Field of Classification Search
CPC .... C09D 133/10; C09D 4/06; C09D 133/066; C08J 3/075; C08J 7/054; C08J 7/056; C08K 5/00; C08K 5/0025; C08L 33/10; C08L 2201/10; C08F 2/48; C08F 220/20; C08F 265/06; C08F 220/06; C08F 220/14; C08F 220/387; C08F 220/585; C08F 222/102; C08F 222/1063
See application file for complete search history.

(56) References Cited

U.S. PATENT DOCUMENTS 10,494,540 B2   12/2019   Fukagawa

FOREIGN PATENT DOCUMENTS

| CN | 108 504 150 A | 9/2018 | |
|---|---|---|---|
| CN | 110 358 006 A | 10/2019 | |
| CN | 110 437 699 A | 11/2019 | |
| JP | 2017-061598 A | * 3/2017 | ................ C08F 2/44 |
| WO | WO 2007/018269 A1 | 2/2007 | |
| WO | WO 2018/079592 A1 | 5/2018 | |

OTHER PUBLICATIONS

Suga et al., machine English translation of JP2017-061598 (Year: 2017).*
International Search Report and Written Opinion for International Application No. PCT/US2022/042523, dated Jun. 12, 2022, 14 pages.
Examination Report No. 1 from the Australian Government for Application No. 2022337152, dated May 24, 2024, 3 pages.

* cited by examiner

*Primary Examiner* — Jessica M Roswell
(74) *Attorney, Agent, or Firm* — Finnegan, Henderson, Farabow, Garrett & Dunner, LLP (57) ABSTRACT

An anti-fog material comprising a zwitterionic-doped hydrogel made up of charged monomers, at least a portion of which comprise zwitterionic monomers, uncharged hydrophilic monomers, and at least one crosslinking agent is disclosed. A composition for forming the hydrogel and a transparent, removable article comprising the anti-fog material are also disclosed. The article, which may be in the form of a film or decal, may comprise an active layer attached to a backing layer, the active layer comprising an anti-fog material described herein. A method of making a surface of a substrate resistant to fogging by applying the transparent and removable article thereto is also disclosed.

28 Claims, 2 Drawing Sheets

FIG. 2

ZWITTERIONIC-DOPED HYDROGELS AND ANTI-FOGGING COATINGS COMPRISING THE SAME

CROSS REFERENCE TO RELATED APPLICATION

This application claims the benefit of priority to U.S. Provisional Application No. 63/240,629, filed Sep. 3, 2021, the contents of which is incorporated herein by reference in its entirety.

TECHNICAL FIELD

The present disclosure generally relates to anti-fog coatings and methods of making the same. Embodiments of the present disclosure also relate to compositions used to make such coatings, as well as to films and decals comprising such compositions that can be applied to desired substrates that benefit from optically transparent, anti-fog coatings, such as automotive windshields, camera lenses and freezer windows.

BACKGROUND

Anti-fogging coatings are commonly used to keep glass or other transparent substrates from becoming clouded by water condensation. A fogging environment occurs when the temperature of a surface is below the ambient dew point, which allows for water vapor to condense on the surface to form droplets. The size and shape of these droplets of water cause them to scatter light, which can reduce the optical clarity through the surface. Some prior inventions focus on applying a hydrophobic coating, such as a silicone, to a substrate. These materials can work for a short duration, but they can be overwhelmed by aggressively fogging environments, resulting in a larger number of droplet nuclei forming on the surface. A more common strategy is using a hydrophilic coating, so that water droplets possess a low contact angle with the coated substrate, which leads to the water forming transparent flat sheets.

Hydrophilic coatings face a tradeoff between efficacy and durability. In a fogging environment where surface temperatures are below the ambient due point, hydrophilic coatings remain clear by favorably interacting with liquid water, which results in a low contact angle that causes liquid water to form a flat film across the coating. However, due to these coatings' strong interaction with liquid water, they may be easily washed away, or they may swell in the presence of liquid water or water vapor and become susceptible to damage. Conversely, more mechanically durable coatings incorporate stronger intermolecular connections within the coating, such as chemical crosslinks or hydrophobic interactions, but this can diminish the hydrophilicity of the coating and reduce performance.

Many hydrophilic coatings are "hydrogels", which swell when exposed to liquid water or water vapor. These gels can be negatively affected by several factors. The interactions of hydrogels with molecular water are known to be highly dependent on the precise environmental conditions; changing the temperature, pH, or salt concentration can modify the interaction strength of the gel with molecular water, thus affecting the degree of swelling by several orders of magnitude. Consequently, both the mechanical and anti-fogging properties of a coating made from these materials are often not reliable for many applications. In addition to their unpredictable properties, the specific molecular groups that give rise to the gels' hydrophilicity are known to have poor mechanical properties. Many common anti-fogging coatings require a significant fraction of the material to consist of these active groups, which requires the mechanical durability of the coating to be sacrificed.

The disclosed anti-fogging zwitterionic-doped hydrogel compositions are directed to overcoming one or more of the problems set forth above and/or other problems of the prior art. In particular, the compositions disclosed herein have a high fogging resistance. In addition, when the composition is made into a coating it is mechanically durable, and not easily scratched, damaged, or fouled during use. Finally, in some embodiments, the composition can be made into a decal or film rendering them easy to apply, and remove, if necessary.

SUMMARY

In view of the foregoing, there is disclosed a composition for imparting anti-fog properties comprising a zwitterionic-doped hydrogel. In one embodiment, there is described a composition for forming a hydrogel that imparts anti-fog properties to the hydrogel, the composition comprising: charged monomers, at least a portion of which comprise zwitterionic monomers; and uncharged hydrophilic monomers, wherein the charged monomer and the uncharged hydrophilic monomers contain reactive groups, which react to form the hydrogel having anti-fog properties.

In another embodiment, there is described an anti-fog material comprising a zwitterionic-doped hydrogel, the zwitterionic-doped hydrogel comprising: charged monomeric residues, at least a portion of which comprise zwitterionic monomeric residues; uncharged hydrophilic monomeric residues; and at least one crosslinking agent residue, wherein the anti-fog material exhibits Δ Haze values less than 5% when exposed to fog conditions.

In yet another embodiment, there is described a coated article comprising: a substrate and an anti-fog coating, said anti-fog coating comprising: zwitterionic-doped hydrogel, the zwitterionic-doped hydrogel comprising: charged monomeric residues, at least a portion of which comprise zwitterionic monomeric residues; uncharged hydrophilic monomeric residues; and at least one crosslinking agent residue.

In another embodiment, there is disclosed a method of making a surface of a substrate resistant to fogging, the method comprising: applying to the surface of the substrate a zwitterionic-doped hydrogel comprising: charged monomeric residues, at least a portion of which comprise zwitterionic monomeric residues; uncharged hydrophilic monomeric residues; and at least one crosslinking agent residue. Non-limiting examples of articles and surfaces that could benefit from the anti-fog material described herein include automotive or architectural windows, camera lenses, medical scope lenses, sensors, eye wear, mirror, refrigerator doors, or architectural structures.

As described in more detail below, the various embodiments may include at least one additive that aids in resulting properties of the composition, hydrogel, article or method, such as an additive that aids adhesion, anti-freeze, crosslinking, film-forming, mechanical or rheological properties.

BRIEF DESCRIPTION OF THE DRAWINGS

The accompanying figures, which are incorporated in and constitute a part of this specification, illustrate several embodiments of the invention and together with the description, help explain the principles of the invention.

FIGS. 1A-1C show the inventive coating swelling and sheeting water in a fogging environment.

DETAILED DESCRIPTION

Definitions

As used herein, "Δ Haze", refers to the difference in haze measurements performed according to ASTM D1003 from before and after steam exposure. The haze of a sample equilibrated at 25° C. was measured using ASTM D1003. Then, the sample was held over a beaker of boiling water for 30 seconds and the haze of the sample was evaluated again using ASTM D1003. The first measurement subtracted from the second measurement is defined as "Δ Haze." A substrate coated with the inventive material exhibits Δ Haze properties of less than 5%, such as less than 2% and in many cases, less than 1%. In certain embodiments, a substrate coated with the inventive material, such as a laminate made according to the present disclosure, exhibits a Δ Haze ranging from 0.1% to less than 1%, such as 0.1% to 0.8%.

As used herein, "aids in adhesion", means increasing the strength of the connection between the coating and the substrate that it is coated on. A standardized way of measuring adhesion strength is by ASTM D3359 tape or crosshatch test.

As used herein, "aids in crosslinking" means increases the degree or density of crosslinking.

As used herein, "aids in film-forming" means increases the ability of the coating to form a smooth, continuous layer with minimal pinholes or defects.

As used herein, "aids in anti-freeze", means decreasing the temperature required for frost to form on the material, increasing the time required for frost to form on the material, or both.

As used herein, "aids in mechanical properties", means increasing the scratch resistance, abrasion resistance, hardness, Young's modulus, flexibility, shear modulus, or the bending radius of the coating.

As used herein, "aids in rheological properties", means increasing or decreasing the viscosity of the coating solution to ease the process of applying the coating to substrates.

As used herein, "monomer" refers to a chemical entity having one or more reactive chemical groups configured for polymerization. For example, methacrylates are monomers having a reactive alkene configured for polymerization.

As used herein, "monomeric residue" refers to a chemical fragment incorporated in a polymer. For example, polymerization of methacrylate monomers incorporates methacrylic residues into a poly(methacrylic) polymer.

There is disclosed a hydrophilic anti-fog coating with excellent fogging resistance and durability. The hydrophilic coating provides anti-fog protection by forming a low equilibrium contact angle of less than 30° with water droplets on a coated surface. This property causes the water droplets to form flat sheets on the surface and therefore prevents any optical distortion. An effective anti-fogging coating maintains high optical clarity in a fogging environment. This can be evaluated using visual observation, or quantitatively with methods such as measuring the haze of films in a fogging environment via ASTM D1003, or measuring the degree of distortion of an image viewed through an anti-fog film following a modification of the standard EN-168. This technique involves preparing a humid chamber according to the conditions specified in EN-168. At one side of the chamber, a Siemens star was installed as a visual target, opposite an opening in the chamber. A sample was placed over the opening with the anti-fogging coating facing the interior of the humid chamber. Images were taken every minute, and the modular transfer function was calculated using the NIH ImageJ image processing program and compared to the calculated modular transfer function of images taken under non-fogging conditions.

Figure 1A:
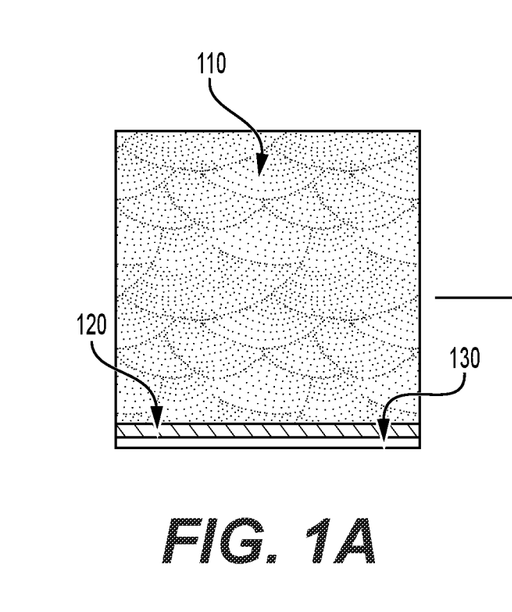
FIG. 1A depicts a substrate 130 with the inventive coating 120 in a fogging environment 110 laden with water vapor.
Figure 1B:
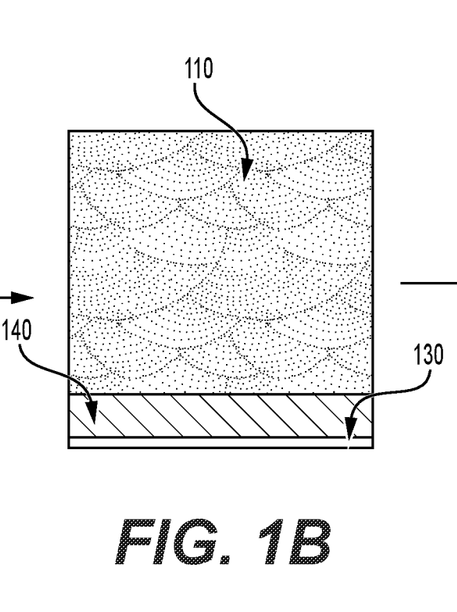
FIG. 1B shows the inventive coating in a swelled state 140 having absorbed water from the environment 110.
Figure 1C:
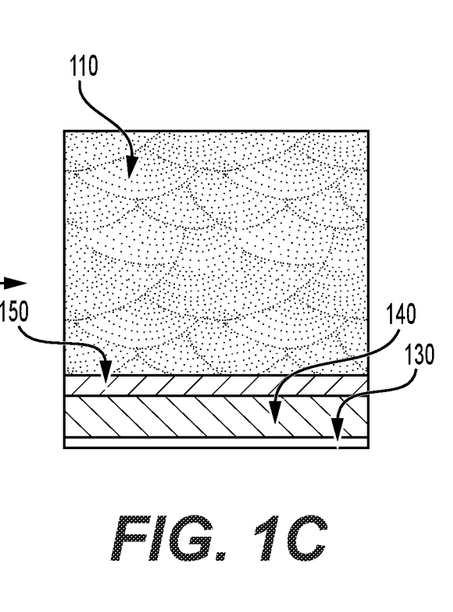
FIG. 1C shows water condensing into a thin transparent sheet 150 on the swollen coating 140 in a fogging environment.

The mechanism by which the disclosed coatings can work is demonstrated in the figures. For example, FIGS. 1A-1C illustrate how an inventive coating, when placed on top of a substrate in a humid environment, provides anti-fogging properties. FIG. 1A illustrates an inventive coating 120 on top of a substrate 130 in a fogging environment 110 laden with water vapor. As shown in FIG. 1A, the inventive coating 120 that is below the ambient dew point is exposed to a water-vapor laden environment 110, the water molecules from the environment can be absorbed into the coating. As further illustrated in FIG. 1B, absorption of the water vapor swells the coating 140 and retards the formation of liquid water droplets due to condensation on the surface that could distort clarity through the coating. FIG. 1C further shows that after the inventive coating 140 has begun to swell, additional water vapor can condense on the swollen coating 140, spread and form an even transparent sheet 150 over the swollen coating 140.

Figure 2:
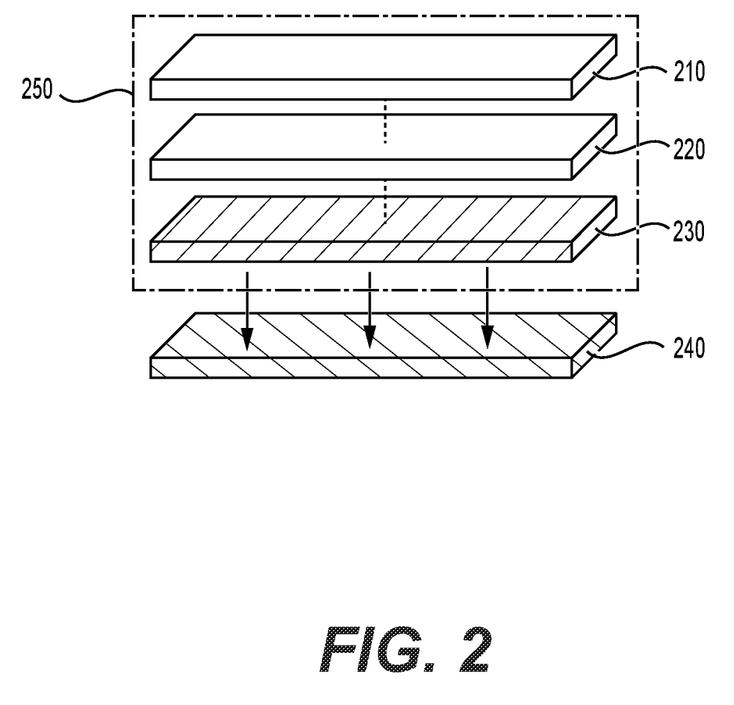
FIG. 2 is a schematic of an inventive laminate that is applied to target substrates.

FIG. 2 exemplifies an embodiment of this invention 200 showing a coating 210 that is applied to target substrate 240. In this embodiment, the active coating 210 is applied to a target substrate 240 using an optional appropriate transparent substrate 220, and optionally backed with a clear adhesive 230. The optional transparent substrate and clear adhesive allow a coating made according to the present disclosure to be easily applied to a wide variety of surfaces that would benefit from such coatings. The check box 250 enclosing layers 210, 220, and 230, reflects the composite that constitutes the laminate according to one embodiment of the present disclosure, which does not include the substrate. Non-limiting examples of such surfaces that can form the substrate include automotive windows, camera lenses, sensors, such as lidar, radar, microwave, optical sensors, eye wear, including eye glasses, visors, masks, goggles, shields and sunglasses, freezer windows, and mirrors, such as bathroom mirrors.

In the embodiment of the invention where the coating is applied as a laminate decal, the processing and application complications can be handled during manufacturing. Consequently, the coating can be heavily crosslinked, textured, applied at an optimal thickness, or designed in a multilayer structure when it is applied to the film. When a user receives the product, they only need to adhere it to their target substrate. As a result, the performance and durability of the coating can be fully optimized ex situ, while increasing its ease of application.

Additionally, in the embodiment of the invention where the coating is applied as a laminate decal, if the coating is damaged during the operation of the target substrate, the decal can be easily removed and replaced by peeling it off the target substrate. As no solvents are necessary to remove the coating from the substrate, and no highly specialized equipment is necessary to reapply it, this would allow for facile maintenance.

The anti-fogging coating comprises charged monomers, uncharged monomers, and crosslinkers. The charged monomers include a hydrophilic moiety which results in superior anti-fogging properties of the coating. At least some fraction of the charged monomers are zwitterionic monomers, such as phosphorylcholines, carboxybetaines, sulfobetaines like N-(3-sulfopropyl)-N-(methacryloxyethyl)-N,N-dimethyl-ammonium betaine (also known as DMAPS), 2-Methacryloyloxyethyl phosphorylcholine, sulfobetaineacrylamide, or carboxybetaine methacrylate. Zwitterionic molecules have both a positive and negative moiety, and so remain charge balanced without counterions. These zwitterionic materials tend to be quite hydrophilic, and retain good hydrophilic properties under a wide range of pH and salt concentrations.

In one embodiment, the charged monomers may also include a singly charged monomer, which includes a monomer bearing an acidic functionality, a basic functionality, or the acidic or basic entity in a neutralized state, such as carboxylic acids like acrylic acid or methacrylic acid, sulfonic acids like 2-Acrylamido-2-methylpropane sulfonic acid (AMPS), quatenary amines, or other similar moieties.

The remainder of the polymer can be formed from one or multiple monomers such as vinylpyrrolidone, acrylamide, acrylates or methacrylates containing polyethylene glycol, hydroxyethyl methacrylate, maleic anhydride, vinyl alcohol, vinyl acetate, vinylpyridine, diethylaminoethyl methacrylate (DEAMA), cellulose-based polymers, or other similar monomers, or monomers including any of those functionalities.

Importantly, zwitterionic materials suffer from the "anti-polyelectrolyte effect", where they have poor solubility and undergo a low degree of swelling in deionized water, but they are capable of higher water uptake in the presence of salt. Conventional hydrogels based upon singly charged monomers show the reverse behavior, collapsing or even turning hydrophobic in the presence of salts. Blending single charged and zwitterionic monomers can result in final polymer hydrogels with more consistent swelling behavior across a range of salt concentrations and pHs. The present disclosure utilizes this effect as the basis for developing a durable anti-fog coating. This strategy allows for a smaller quantity of expensive, mechanically weak zwitterionic material to be used while achieving satisfactory fogging performance. These charged monomers are reacted with an uncharged hydrophilic monomer, such as hydroxyethylmethacrylate, that makes up the plurality of the formulation and provides mechanical strength without contributing hydrophobicity to the film. Some of the monomers may be pre-polymerized to form oligomers or short polymers in order to aid in the processing of the coating.

Additionally, a crosslinking agent is added to increase the degree of crosslinking, which enhances the mechanical properties of the film and prevents it from being easily washed away in water. The crosslinking agent may contain multiple vinyl groups capable of undergoing free radical polymerization, such as multifunctional polyethylene glycol acrylate, or a hydrophilic urethane acrylate. Films prepared in this manner may incorporate a photo-initiator to enable the crosslinking reaction. The photo-initiators are activated with UV light to cure or crosslink the film.

Alternatively, the crosslinkers may consist of thermally or pH activated crosslinking groups, such as blocked or unblocked isocyanates, aziridines, melamines, epoxides, oxazolines, amines, hydrazides, glutaraldehyde, silanes, epoxies, or carbodiimides. These groups can react with the non-zwitterionic monomers, when exposed to a sufficiently high temperature or particular pH to crosslink the film. Dynamic bonding species such as borate ions, metal ions such as $Zn^{2+}$ or $Fe^{3+}$ may be incorporated as well. Different crosslinking systems may be chosen or combined to optimize the balance of anti-fogging properties, mechanical properties, and ease of processing during film preparation.

The active layer may also include additives that aid in the crosslinking, film-forming, rheological properties, or other properties of the active layer. The active layer may also include additives, such as nanoparticles, waxes, or other polymer resins that affect the mechanical properties of the active layer, its rheological properties, its film-forming abilities, or other properties of the active layer. The active layer may also contain some surfactants or other types of additives to improve the film-forming ability of the active material.

The active layer may be formed from a precursor solution. The solution of precursors to the active layer are applied to the substrate, which can be a polyester, polycarbonate, polyacrylate, glass, cellulose acetate, triacetal cellulose, or other material. The substrate may be pre-treated with chemical reagents, plasma, corona discharge, UV radiation, ozone, or other treatment to activate the surface and enhance the adhesion between the active layer and the substrate.

The molecular weight of the polymers applied to the substrate can range from 0.5 kDa to 100 MDa, or they can be applied as monomers, oligomers, or prepolymers and polymerized afterwards.

In one embodiment, one or more solvents can be used. Non-limiting examples of such solvents include water, alcohols such as methanol, ethanol, and isopropanol, amines like ammonium hydroxide or triethylamine, ethers, ketones such as acetone, ethyl acetate, or methyl ethyl ketone, or others that are appropriate for the polymers in question.

In one embodiment, one or more fillers can be used. Non-limiting examples of such fillers include silica particles, alumina particles, calcium carbonate particles, cellulose nanocrystals, particles of insoluble polymers, clays, or more. These particles can improve the mechanical properties of the coating or improve their thermal transport properties so that they reach the temperature of the ambient environment faster.

In one embodiment, one or more additives can be used. Non-limiting examples of such additives include leveling additives, anti-foaming additives, surfactants, surface tension modifying additives that improve the ability of the coatings to resist fouling, their ability to form films, and their resistance to damage. Some additives can be added to swell the polymers, such as propylene glycol, ethylene glycol, other glycols, non-volatile alcohols, esters, and ketones.

In one embodiment, the additives may include inorganic salts, which may help the coating resist ice and frost formation. Some additives may include amine-containing molecules such as polyethylenimine or thiol-containing molecules to improve crosslinking and adhesion to the substrate.

In the embodiment where the coating is applied as a laminate decal, the transparent substrate can be many different transparent media, including polyesters such as polycarbonate, PMMA, PET, polyurethane, vinyl polymers, cellulose acetate, triacetal cellulose, rubbers, or any other appropriate polymer. The transparent substrate can be used as received, or treated in several different ways to modify the adhesion of the active layer to the substrate, including: micropatterning the surface using imprint lithography, roughening the surface to add texture, exposing the surface to UV radiation of oxidize the surface, exposing the surface to UV-ozone to oxidize the surface, treating the surface with plasma, treating the surface with corona discharge, treating the surface with chemical primers, such as diamines, or installing photoinitiators directly onto the surface. Alternatively, the active layer may be cast on a release material (such as PTFE), and an adhesive directly applied to the active layer. The laminate decal can adhere to target substrates by means of an adhesive, static cling, friction, or other adhesive mechanism.

In a first embodiment, there is described a composition for forming a hydrogel that imparts anti-fog properties to the hydrogel, the composition comprising: charged monomers, at least a portion of which comprise zwitterionic monomers; and uncharged hydrophilic monomers, wherein the charged monomer and the uncharged hydrophilic monomers contain reactive groups, which react to form said hydrogel having anti-fog properties.

In the first embodiment, the zwitterionic monomer may comprise phosphorylcholines, carboxybetaines, and sulfobetaines. For example, the zwitterionic monomer may comprise N-(3-sulfopropyl)-N-(methacryloxyethyl)-N,N-dimethylammonium betaine, 2-Methacryloyloxyethyl phosphorylcholine, sulfobetaineacrylamide, or carboxybetaine methacrylate.

In the first embodiment, the concentration of zwitterionic monomer in the material is greater than 0% and less than 75% by weight, such as greater than 0% and less than 50% by weight, or even greater than 0% and less than 25% by weight.

In the first embodiment, the charged monomers further comprise acrylates or methacrylates containing carboxylic acid, sulfonic acid, or quaternary amine functional groups.

The charged monomers exhibit hydrophilic properties at pH 2 to 9 or 0 M to 1 M sodium chloride solution. Therefore, the charged monomers have acidic functionality, basic functionality, or are the salt of a neutralized acid or base.

In the first embodiment, the uncharged hydrophilic monomers may comprise vinylpyrrolidone, acrylamide, ethylene glycol containing acrylates or methacrylates, hydroxyethyl methacrylate, vinyl alcohol, vinyl acetate, diethylaminoethyl methacrylate, dimethylaminoethyl acrylate, or other acrylates or methacrylates bearing hydrophilic but uncharged moieties.

In the first embodiment, the composition may further comprise at least one crosslinking agent. In one embodiment, the at least one crosslinking agent is found in the composition in an amount sufficient to form a crosslinked polymer, such as in an amount ranging from 2% to 35% by weight, such as 4% to 25% by weight, or even 5% to 20% by weight, wherein the composition imparts anti-fog properties to the crosslinked polymer.

In the first embodiment, the at least one crosslinking agent may comprise molecules with vinyl groups capable of undergoing free radical polymerization. For example, the at least one crosslinking agent comprising molecules with vinyl groups capable of undergoing free radical polymerization comprise a multifunctional polyethylene glycol acrylate, or a hydrophilic urethane acrylate. The at least one crosslinking agent may comprise molecules that contain moieties that can react with carboxyl, alcohol, or amine functional groups. For example, the moieties may be chosen such that they can react with carboxyl, alcohol, epoxy, carbonyl, or amine functional groups comprise carbodiimide, isocyanate, aziderines, oxazoline, amine, hydrazide, silane, epoxy, melamine, and other amino crosslinkers.

In the first embodiment, the composition may further comprise at least one photoinitiator that includes phosphine oxides, phenones, azo initiators, peroxides or benzoyls. The phosphine oxides may comprise 2,4,6-Trimethylbenzoyl-diphenyl phosphine oxide, the phenones may comprise 2-hydroxy-2-methylpropiophenone or benzophenone, azobisisobutyronitrile, the peroxides may comprise benzoyl peroxide, and the benzoyls may comprise 2,2-dimethoxy-1,2-diphenyl-ethan-1-one.

In the first embodiment, the composition may further comprise at least one additive that aids in adhesion, crosslinking, film-forming, anti-freeze, mechanical or rheological properties of the anti-fog material. For example, the at least one additive that aids in adhesion may comprise (3-Aminopropyl) triethoxysilane or polyethylenimine. The at least one additive that aids in anti-freeze properties may comprise glycerol, ethylene glycol, propylene glycol, or polyethylene glycol. The at least one additive that aids in mechanical properties may comprise at least one nanoparticle or polymer resin. For example, the at least one nanoparticle may comprise silica nanoparticles, alumina nanoparticles, cellulose nanoparticles, or other mineral fillers.

The at least one polymer resin may comprise polyurethane, polyacrylate, polymethacrylate, polystyrene, polyethylene, polypropylene, paraffin wax, natural waxes, or combinations thereof.

The at least one additive that aids in film-forming may comprise triton, tween, sodium dodecyl sulfate, or cetyl trimethylammonium bromide surfactants, dispersants, styrene maleic acid copolymers, leveling agents, or polyacrylates modified with silicones and/or polyethers.

In the first embodiment, the composition may further comprise a carrier solvent comprising water, volatile alcohols, volatile ketones, volatile ethers, and volatile amines.

In a second embodiment, there is described an anti-fog material comprising a zwitterionic-doped hydrogel, the zwitterionic-doped hydrogel comprising: charged monomeric residues, at least a portion of which comprise zwitterionic monomeic residues; uncharged hydrophilic monomeric residues; and at least one crosslinking agent residue, wherein the anti-fog material exhibits Δ Haze values less than 5% when exposed to fog conditions.

In the second embodiment, the zwitterionic monomeric residues may comprise phosphorylcholines, carboxybetaines, and sulfobetaines. For example, the zwitterionic monomeric residues may comprise residues of N-(3-sulfopropyl)-N-(methacryloxyethyl)-N,N-dimethylammonium betaine, 2-Methacryloyloxyethyl phosphorylcholine, sulfobetaineacrylamide, or carboxybetaine methacrylate.

In the second embodiment, the concentration of zwitterionic monomeric residues in the material may be greater than 0% and less than 75% by weight, such as greater than 0% and less than 50% by weight or even greater than 0% and less than 25% by weight.

In the second embodiment, the charged monomeric residues may further comprise acrylates or methacrylates containing carboxylic acid, sulfonic acid, or quaternary amine functional groups.

In the second embodiment, the charged monomeric residues may exhibit hydrophilic properties at pH 2 to 9 or in 0 M to 1 M sodium chloride solution. Therefore, the charged monomers have acidic functionality, basic functionality, or are the salt of a neutralized acid or base.

In the second embodiment, the uncharged hydrophilic monomeric residues may comprise residues of vinylpyrrolidone, acrylamide, ethylene glycol containing acrylates or methacrylates, hydroxyethyl methacrylate, vinyl alcohol, vinyl acetate, diethylaminoethyl methacrylate, dimethylaminoethyl acrylate, or other acrylates or methacrylates bearing hydrophilic but uncharged moieties.

In the second embodiment, the at least one crosslinking agent residue may comprise residues of molecules with vinyl groups capable of undergoing free radical polymerization. For example, the at least one crosslinking agent residue may comprise residues of molecules with vinyl groups capable of undergoing free radical polymerization comprise a multifunctional polyethylene glycol acrylate, or a hydrophilic urethane acrylate.

In the second embodiment, the at least one crosslinking agent residue may comprise residues of molecules that contain moieties that can react with carboxyl, alcohol, epoxy, carbonyl, or amine functional groups. For example, the moieties may be chosen such that they can react with carboxyl, alcohol, or amine functional groups may comprise carbodiimide, isocyanate, aziderines, oxazoline, amine, hydrazide, silane, epoxy, melamine, and other amino crosslinkers.

The second embodiment may further comprise at least one photoinitiator that comprises phosphine oxides, phenones, azobisisobutyronitrile, peroxides or benzoyls. For example, the phosphine oxides may comprise 2,4,6-Trimethylbenzoyl-diphenyl phosphine oxide, the phenones comprise 2-hydroxy-2-methylpropiophenone or benzophenone, azobisisobutyronitrile, the peroxides comprise benzoyl peroxide, and the benzoyls comprise 2,2-dimethoxy-1,2-diphenyl-ethan-1-one.

The second embodiment may further comprise at least one additive that aids in adhesion, crosslinking, film-forming, anti-freeze, mechanical or rheological properties of the anti-fog material. For example, the at least one additive that aids in adhesion may comprise (3-Aminopropyl)triethoxysilane or polyethylenimine. The at least one additive that aids in anti-freeze properties may comprise glycerol, ethylene glycol, propylene glycol, or polyethylene glycol. The at least one additive that aids in mechanical properties may comprise at least one nanoparticle or polymer resin.

The at least one nanoparticle may comprise silica nanoparticles, alumina nanoparticles, cellulose nanoparticles, or other mineral fillers. The at least one polymer resin may comprise polyurethane, polyacrylate, polymethacrylate, polystyrene, polyethylene, polypropylene, paraffin wax, natural waxes, or combinations thereof. The at least one additive that aids in film-forming may comprise triton, tween, sodium dodecyl sulfate, or cetyl trimethylammonium bromide surfactants, dispersants, styrene maleic acid copolymers, leveling agents, or polyacrylates modified with silicones and/or polyethers.

A third embodiment is directed to coated articles comprising: a substrate and an anti-fog coating, wherein the anti-fog coating comprises a zwitterionic-doped hydrogel, comprising: charged monomeric residues, at least a portion of which comprise zwitterionic monomeric residues; uncharged hydrophilic monomeric residues; and at least one crosslinking agent residue.

In the third embodiment, the zwitterionic monomeric residues may comprise residues of phosphorylcholines, carboxybetaines, sulfobetaines. For example, the zwitterionic monomeric residues may comprise residues of N-(3-sulfopropyl)-N-(methacryloxyethyl)-N,N-dimethylammonium betaine, 2-Methacryloyloxyethyl phosphorylcholine, sulfobetaineacrylamide, or carboxybetaine methacrylate.

In the third embodiment, the concentration of zwitterionic monomeric residues in the material may be greater than 0% and less than 75% by weight, such as greater than 0% and less than 50% by weight, or even greater than 0% and less than 25% by weight.

In the third embodiment, the charged monomeric residues may further comprise residues of acrylates or methacrylates containing carboxylic acid, sulfonic acid, or quatenary amine functional groups.

In the third embodiment, the charged monomeric residues may exhibit hydrophilic properties at pH 2 to 9 and salt concentrations 0 M to 1 M sodium chloride solution. As a result, the charged monomers may have acidic functionality, basic functionality, or are the salt of a neutralized acid or base.

In the third embodiment, the uncharged hydrophilic monomeric residues may comprise residues of vinylpyrrolidone, acrylamide, ethylene glycol containing acrylates or methacrylates, hydroxyethyl methacrylate, vinyl alcohol, vinyl acetate, diethylaminoethyl methacrylate, dimethylaminoethyl acrylate, or other acrylates or methacrylates bearing hydrophilic but uncharged moieties.

In the third embodiment, the at least one crosslinking agent residue may comprise molecules with vinyl groups capable of undergoing free radical polymerization. For example, the at least one crosslinking agent residue may comprise residues of molecules with vinyl groups capable of undergoing free radical polymerization comprise a multifunctional polyethylene glycol acrylate, or a hydrophilic urethane acrylate. The at least one crosslinking agent residue may comprise residues of molecules that contain moieties that can react with carboxyl, alcohol, epoxy, carbonyl, or amine functional groups. For example, the moieties may be chosen such that they can react with carboxyl, alcohol, or amine functional groups may comprise carbodiimide, isocyanate, aziderines, oxazoline, amine, hydrazide, silane, epoxy, melamine, and other amino crosslinkers.

The third embodiment may further comprise at least one photoinitiator that comprises phosphine oxides, phenones, azobisisobutyronitrile, peroxides or benzoyls.

In the third embodiment, said phosphine oxides may comprise 2,4,6-Trimethylbenzoyl-diphenyl phosphine oxide, said phenones comprise 2-hydroxy-2-methylpropiophenone or benzophenone, azobisisobutyronitrile, said peroxides comprise benzoyl peroxide, and said benzoyls comprise 2,2-dimethoxy-1,2-diphenyl-ethan-1-one.

The third embodiment may further comprise at least one additive that aids in adhesion, crosslinking, film-forming, anti-freeze, mechanical or rheological properties of the anti-fog material. The at least one additive that aids in adhesion may comprise (3-Aminopropyl)triethoxysilane or polyethylenimine. The at least one additive that aids in anti-freeze properties may comprise glycerol, ethylene glycol, propylene glycol, or polyethylene glycol. The at least one additive that aids in mechanical properties may comprise at least one nanoparticle or polymer resin.

The at least one nanoparticle may comprise silica nanoparticles, alumina nanoparticles, cellulose nanoparticles, or other mineral fillers. For example, the at least one polymer resin may comprise polyurethane, polyacrylate, polymethacrylate, polystyrene, polyethylene, polypropylene, paraffin wax, natural waxes, or combinations thereof. The at least one additive that aids in film-forming may comprise triton, tween, sodium dodecyl sulfate, or cetyl trimethylammonium bromide surfactants, dispersants, styrene maleic acid copolymers, leveling agents, or polyacrylates modified with silicones and/or polyethers.

The third embodiment may be in the form of a laminate, wherein the laminate may comprise a transparent substrate, a clear adhesive, and coating. For example, the adhesive may comprise an adhesive selected from acrylic adhesives, silicone adhesives, urethane heat-seal adhesives, polyethylene heat seal adhesives, and combinations thereof. The transparent substrate may comprise polyethylene, polyethylene terephthalate, polycarbonate, cellulose acetate, triacetal cellulose, polyacrylate, or combinations thereof.

The coated articles described herein, and exemplified in the third embodiment, may exhibit Δ Haze values less than 5% when exposed to fog conditions. Non-limiting examples of the articles encompassed by the third embodiment include automotive or architectural windows, camera lenses, medical scope lenses, sensors, eye wear, mirrors, refrigerator doors, or architectural structures.

In a fourth embodiment, disclosed are methods of making a surface of a substrate resistant to fogging, the method comprising: applying to the surface of the substrate a zwitterionic-doped hydrogel comprising: charged monomeric residues, at least a portion of which comprise zwitterionic monomeric residues; uncharged hydrophilic monomeric residues; and at least one crosslinking agent residue.

In the fourth embodiment, the zwitterionic monomeric residues may comprise phosphorylcholines, carboxybetaines, or sulfobetaines. For example, the zwitterionic monomeric residues may comprise residues of N-(3-sulfopropyl)-N-(methacryloxyethyl)-N,N-dimethylammonium betaine, 2-Methacryloyloxyethyl phosphorylcholine, sulfobetaineacrylamide, or carboxybetaine methacrylate.

In the fourth embodiment, the concentration of zwitterionic monomeric residues in the material may be greater than 0% and less than 75% by weight, such as greater than 0% and less than 50% by weight, or even greater than 0% and less than 25% by weight.

In the fourth embodiment, the charged monomeric residues may further comprise residues of acrylates or methacrylates containing carboxylic acid, sulfonic acid, or quatenary amine functional groups.

In the fourth embodiment, the charged monomeric residues may exhibit hydrophilic properties at pH 2 to 9 or 0 M to 1 M sodium chloride solution. As a result, the charged monomeric residues may have acidic functionality, basic functionality, or are the salt of a neutralized acid or base.

In the fourth embodiment, the uncharged hydrophilic monomeric residues may comprise residues of vinylpyrrolidone, acrylamide, ethylene glycol containing acrylates or methacrylates, hydroxyethyl methacrylate, vinyl alcohol, vinyl acetate, diethylaminoethyl methacrylate, dimethylaminoethyl acrylate, or other acrylates or methacrylates bearing hydrophilic but uncharged moieties.

In the fourth embodiment, the at least one crosslinking agent residue may comprise residues of molecules with vinyl groups capable of undergoing free radical polymerization. For example, the at least one crosslinking agent residues may comprise residues of molecules with vinyl groups capable of undergoing free radical polymerization comprise a multifunctional polyethylene glycol acrylate, or a hydrophilic urethane acrylate. The at least one crosslinking agent residue may comprise residues of molecules that contain moieties that can react with carboxyl, alcohol, epoxy, carbonyl, or amine functional groups. The moieties are chosen such that they can react with carboxyl, alcohol, or amine functional groups may comprise carbodiimide, isocyanate, azidrines, oxazoline, amine, hydrazide, silane, epoxy, melamine, and other amino crosslinkers.

The fourth embodiment may further comprise at least one photoinitiator that comprises phosphine oxides, phenones, azobisisobutyronitrile, peroxides or benzoyls. The phosphine oxides may comprise 2,4,6-Trimethylbenzoyl-diphenyl phosphine oxide, the phenones comprise 2-hydroxy-2-methylpropiophenone or benzophenone, azobisisobutyronitrile, the peroxides comprise benzoyl peroxide, and the benzoyls comprise 2,2-dimethoxy-1,2-diphenyl-ethan-1-one.

The fourth embodiment may further comprise at least one additive that aids in adhesion, crosslinking, film-forming, anti-freeze, mechanical or rheological properties of the anti-fog material. For example, the at least one additive that aids in adhesion may comprise (3-Aminopropyl)triethoxysilane or polyethylenimine. The at least one additive that aids in anti-freeze properties may comprise glycerol, ethylene glycol, propylene glycol, or polyethylene glycol. The at least one additive that aids in mechanical properties may comprise of at least one nanoparticle or polymer resin.

In the fourth embodiment, the at least one nanoparticle may comprise silica nanoparticles, alumina nanoparticles, cellulose nanoparticles, or other mineral fillers. The at least one polymer resin may comprise polyurethane, polyacrylate, polymethacrylate, polystyrene, polyethylene, polypropylene, paraffin wax, natural waxes, or combinations thereof.

In the fourth embodiment, the at least one additive that aids in film-forming may comprise triton, tween, sodium dodecyl sulfate, or cetyl trimethylammonium bromide surfactants, dispersants, styrene maleic acid copolymers, leveling agents, or polyacrylates modified with silicones and/or polyethers.

In the fourth embodiment, the substrate may be a laminate comprising a transparent substrate, clear adhesive, and coating. The transparent substrate may be modified by plasma, UV, ozone, or other chemical surface modification techniques. The laminate may be in the form of a film or decal.

The fourth embodiment may further comprise a step of coating the zwitterionic hydrogel by at least one technique selected from roll-to-roll method, blade coating, dipping, needle dispensing, or spraying. This method may comprise stepwise serial application of subsets of components which is in the form of a laminate. The method may include applying a primer or adhesion promoter before applying other components. It may also comprise reapplication of one of more components to augment coating performance over time where a second application of the coating formulation is applied on the first. It is understood that some components of the formulation may be applied on top of an initial application.

In one embodiment, antifreeze materials may be applied by spraying, wiping, blade coating, or dipping on top of existing coating.

The substrate described herein may comprise glass, plastic, porcelain, metal or combinations thereof. Similarly, the substrate may comprise automotive or architectural windows, camera lenses, medical scope lenses, sensors, eye wear, mirror, refrigerator doors, or architectural structures.

In the fourth embodiment, the substrate may be treated prior to application of coating material, such as by plasma, UV, or ozone treatment, or other chemical surface modification techniques. The method described herein may comprise in situ crosslinking of zwitterionic hydrogel on the substrate after application. For example, crosslinking may be performed at ambient room temperature conditions or at elevated temperatures and humidity conditions.

The features and advantages of the present invention are more fully shown by the following examples which are provided for purposes of illustration and are not to be construed as limiting the invention in any way.

EXAMPLES

The following examples disclose methods of preparing anti-fog composition and films comprising a zwitterionic-doped hydrogel.

Example 1

This example provides a method for preparing a prepolymer anti-fog composition and films comprising a zwitterionic-doped hydrogel that have improved performance properties according to the present disclosure.

A randomly polymerized prepolymer comprising by mass 8.8% N-(3-Sulfopropyl)-N-(methacryloxyethyl)-N,N-dimethylammonium betaine, 2.8% 2-Acrylamido-2-methylpropane sulfonic acid, and 88.4% hydroxyethylmethacrylate was dissolved in a mixture with the resulting composition by mass of 12.5% prepolymer, 37.5% water, 36% ethanol, 7% polyethylene glycol diacrylate, 5% ethyl acetate, 1% photoinitiator, and 1% leveling additives and surfactants.

A transparent substrate comprising an adhesive-backed polyethylene terephthalate sheet was treated with corona discharge, and a uniform film of coating solution was applied with a blade coater. The solution was irradiated with UV light (~365 nm) for 30 minutes, and the film was heated in an oven at 80° C. for 15 minutes. This laminate decal was then applied to a glass substrate using the adhesive.

Anti-fog properties of this example were tested by exposing the coated substrate to a high humidity environment, formed by holding the coated substrate over boiling water for at least 30 seconds. The sample remained clear for longer than 30 seconds. After being held over boiling water for 30 seconds, an untreated glass slide has a Δ Haze, the difference in haze measurements performed according to ASTM D1003 from before and after steam exposure, above 30%. The coated glass slide exposed to the same conditions had a Δ Haze of 0.8%.

Example 2

In this example, a randomly polymerized prepolymer comprising by mass 25.5% N-(3-Sulfopropyl)-N-(methacryloxyethyl)-N,N-dimethylammonium betaine, 4.8% acrylic acid, and 69.7% hydroxyethylmethacrylate, was dissolved in a mixture with the resulting composition by mass of 8.7% prepolymer, 71.2% water, 20% ethanol, 0.025% anti-foaming additive, 0.25% leveling additive, 0.3% wax additive, and 0.25% surfactant.

Before the coating application, 1 part Carbodilite SV-02 was added to 20 parts coating solution. During coating, an adhesive-backed PET film was treated with corona discharge, and the coating blade coated onto its surface. The coating was dried and cured by heating to 125° C. for 5 minutes. This laminate decal was then applied to a glass substrate using the adhesive.

Anti-fog properties of this example were tested by exposing the coated substrate to a high humidity environment, formed in the same way as in Example 1, e.g., the coated substrate was held over boiling water and remained clear for longer than 30 seconds. After being held over boiling water for 30 seconds, the coated glass had a Δ Haze of 0.1%.

Example 3

In this example, a randomly polymerized prepolymer comprising by mass 32.0% N-(3-Sulfopropyl)-N-(methacryloxyethyl)-N,N-dimethylammonium betaine, 7.2% acrylic acid, 58.4% hydroxyethylmethacrylate, and 2.4% methyl methacrylate, was dissolved in a mixture with the resulting composition by mass of 13% prepolymer, 64.8% water, 22% ethanol, and 0.2% leveling additive.

Before coating application, 1 part carbodiimide crosslinker (such as Carbodilite SV-02) is added to 20 parts coating solution. During coating an adhesive-backed PET film was treated with corona discharge, and the coating blade coated onto its surface. The coating was dried and cured by heating to 130° C. for 5 minutes. This laminate decal was then applied to a glass substrate using the adhesive.

Anti-fog properties of this example were tested by exposing the coated substrate to a high humidity environment. As in the previous examples, the coated substrate was held over boiling water and remained clear for longer than 30 seconds. After being held over boiling water for 30 seconds, the coated laminate adhered to a glass slide had a Δ Haze of 0.1%.

Mechanical properties of this example were tested by soaking the sample in deionized water for 5 minutes, then wiping the coating dry with a lint-free paper towel. After being held over boiling water for 30 seconds, the coated laminate adhered to a glass slide had a Δ Haze of 0.5%.

Example 4

In this example, a randomly polymerized prepolymer comprising by mass 32.0% N-(3-Sulfopropyl)-N-(methacryloxyethyl)-N,N-dimethylammonium betaine, 7.2% acrylic acid, 58.4% hydroxyethylmethacrylate, and 2.4% methyl methacrylate, was dissolved in a mixture with the resulting composition by mass of 13% prepolymer, 64.8% water, 22% ethanol, 0.2% leveling additive.

Before coating application, 1 part Carbodilite V-02-L2 was added to 20 parts coating solution. During coating, a sheet of clear polycarbonate was treated with corona discharge, and the coating blade coated onto its surface. The coating is dried and cured by heating to 130° C. for 5 minutes.

Anti-fog properties of this example were tested by exposing the coated substrate to a high humidity environment. As in the previous examples, the coated substrate was held over boiling water and remained clear for longer than 30 seconds. After being held over boiling water for 30 seconds, the coated polycarbonate had a Δ Haze of 0.4%.

Example 5

In this example, a randomly polymerized prepolymer comprising by mass 33.0% N-(3-Sulfopropyl)-N-(methacryloxyethyl)-N,N-dimethylammonium betaine, 5.0% acrylic acid, 59.0% hydroxyethylmethacrylate, and 3.0% methyl methacrylate was dissolved in a mixture with the resulting composition by mass of 12.1% prepolymer, 57% water, 23% isopropanol, 0.20% leveling additive, 0.8% triethyl amine, and 6.9% Cymel 385.

During coating, an adhesive-backed PET film is treated with corona discharge, and the coating blade coated onto its surface. The coating was dried and cured by heating to 130° C. for 5 minutes. This laminate decal was then applied to a glass substrate using the adhesive.

Anti-fog properties of this example were tested by exposing the coated substrate to a high humidity environment. As in the previous examples, the coated substrate was held over boiling water and remained clear for longer than 30 seconds.

After being held over boiling water for 30 seconds, the coated laminate adhered to a glass slide had a Δ Haze of 0.3%.

Mechanical properties of this example were tested by soaking the sample in deionized water for 5 minutes, then wiping the coating dry with a lint-free paper towel. After being held over boiling water for 30 seconds, the coated laminate adhered to a glass slide had a Δ Haze of 1.5%.

Example 6

In this example, a randomly polymerized prepolymer comprising by mass 32.0% N-(3-Sulfopropyl)-N-(methacryloxyethyl)-N,N-dimethylammonium betaine, 7.2% acrylic acid, 58.4% hydroxyethylmethacrylate, and 2.4% methyl methacrylate, was dissolved in a mixture with the resulting composition by mass of 10% prepolymer, 65.2% water, 22% ethanol, 1.7% colloidal silica, 0.9% dispersant, and 0.2% leveling additive.

A cleaned substrate was treated with an adhesion agent such as a solution of 2% aminopropyl triethoxy silane in ethanol. After the solvent evaporated, the substrate was baked at 100° C. for 2 minutes, then wiped clean with rubbing alcohol. Before coating application, a 1 part Carbodilite SV-02 was added to 20 parts coating solution. The coating solution was applied to the treated glass substrate via a blade coater, dried, and cured by heating to 130° C. for 5 minutes.

Anti-fog properties of this example were tested by exposing the coated substrate to a high humidity environment. As in the previous examples, the coated substrate was held over boiling water and remained clear for longer than 30 seconds. After being held over boiling water for 30 seconds, the coated glass had a Δ Haze of 0.1%.

Example 7

In this example, a randomly polymerized prepolymer comprising by mass 32.0% N-(3-Sulfopropyl)-N-(methacryloxyethyl)-N,N-dimethylammonium betaine, 7.2% acrylic acid, 58.4% hydroxyethylmethacrylate, and 2.4% methyl methacrylate, was dissolved in a mixture with the resulting composition by mass of 13% prepolymer, 59.4% water, 27.5% isopropanol, and 0.1% leveling additive.

Before coating application, a solution is prepared comprising by mass 10% tetraethoxysilane, 10% (3-glycidoxypropyl)methyldiethoxysilane, and 80% isopropanol was prepared. 3 parts of the solution of silanes in isopropanol and 2 parts of Carbodilite SV-02 are added to 32 parts coating solution. During coating an adhesive-backed PET film was treated with corona discharge, and the coating blade coated onto its surface. The coating was dried and cured by heating to 130° C. for 5 minutes. This laminate decal was then applied to a glass substrate using the adhesive.

Anti-fog properties of this example were tested by exposing the coated substrate to a high humidity environment. As in the previous examples, the coated substrate was held over boiling water and remained clear for longer than 30 seconds. After being held over boiling water for 30 seconds, a coated laminate adhered to a glass slide had a Δ Haze of 0.2%.

Mechanical properties of this example were tested by soaking the sample in deionized water for 5 minutes, then wiping the coating dry with a lint-free paper towel. After being held over boiling water for 30 seconds, a coated laminate adhered to a glass slide had a Δ Haze of 0.8%.

Comparative Example 1

This comparative example does not contain any zwitterionic monomer. A prepolymer comprising by mass 9% acrylic acid, 88% hydroxyethylmethacrylate, and 3% methyl methacrylate, was dissolved in a mixture with the resulting composition of 13% prepolymer, 64.8% water, 22% ethanol, 0.2% leveling additive.

Before coating application, a 1 part carbodiimide crosslinker Carbodilite SV-02 was added to 20 parts coating solution. During coating, an adhesive-backed PET film was treated with corona discharge, and the coating blade coated onto its surface. The coating was dried and cured by heating to 130° C. for 5 minutes. This laminate decal was then applied to a glass substrate using the adhesive.

Anti-fog properties of this example were tested by exposing the coated substrate to a high humidity environment, as described above. As in the previous examples, the coated substrate was held over boiling water and remained clear for longer than 30 seconds. After being held over boiling water for 30 seconds, the coated laminate adhered to a glass slide had a Δ Haze of 19.6%.

Comparative Example 2

This comparative example does not contain any crosslinker. In this example, a randomly polymerized prepolymer comprising by mass 32.0% N-(3-Sulfopropyl)-N-(methacryloxyethyl)-N,N-dimethylammonium betaine, 7.2% acrylic acid, 58.4% hydroxyethylmethacrylate, and 2.4% methyl methacrylate, was dissolved in a mixture with the resulting composition by mass of 13% prepolymer, 59.4% water, 27.5% isopropanol, and 0.1% leveling additive.

During coating, an adhesive-backed PET film was treated with corona discharge, and the coating blade coated onto its surface. The coating was dried and cured by heating to 130° C. for 5 minutes. This laminate decal was then applied to a glass substrate using the adhesive.

Anti-fog properties of this example were tested by exposing the coated substrate to a high humidity environment, as described above. As in the previous examples, the coated substrate was held over boiling water and remained clear for longer than 30 seconds. After being held over boiling water for 30 seconds, the coated laminate adhered to a glass slide had a Δ Haze of 0.5%.

Mechanical properties of this example were tested by soaking the sample in deionized water for 5 minutes, then wiping the coating dry with a lint-free paper towel. Visually, the coating appeared to have been wiped away by the towel. After being held over boiling water for 30 seconds, a coated laminate adhered to a glass slide had a Δ Haze of 67.8%.

INDUSTRIAL APPLICABILITY

The disclosed anti-fog coating comprising a zwitterionic-doped hydrogel, and a method of making a decal or film may be applicable to a variety of industrial or consumer uses in which optical clarity is required and fogging is detrimental to the application. Non-limiting examples of such uses include coatings on automotive windows, camera lenses, sensors, such as lidar, radar, microwave, optical sensors, eye wear, including eye glasses, visors, masks, goggles, shields and sunglasses, freezer windows, and mirrors, such as bathroom mirrors.

In addition, architectural designs that could benefit from the use of various embodiments disclosed herein include various glass and plastic products in different parts of a building, such as store-front displays and windows, greenhouses, cold storage food displays and freezer windows, shower doors, and glass enclosures around sporting events, such as ice hockey rinks.

Embodiments disclosed herein can be used to coat the camera attached to a scope used in a variety of medical applications. For example, endoscopes including gastroscopes, bronchoscopes, cystoscope, ureteroscopy, arthroscope, as well as colonoscope, all could benefit from anti-fog characteristics associated with the disclosed invention.

Other embodiments of the invention will be apparent to those skilled in the art from consideration of the specification and practice of the invention disclosed herein. It is intended that the specification and examples be considered as exemplary only, with the true scope of the invention being indicated by the following claims.

What is claimed is:

1. A composition for forming a hydrogel that imparts anti-fog properties to the hydrogel, the composition comprising:
charged monomers, at least a portion of which comprise zwitterionic monomers, and uncharged hydrophilic monomers,
wherein the charged monomers and the uncharged hydrophilic monomers contain reactive groups, which react to form said hydrogel having anti-fog properties,
wherein the hydrogel exhibits Δ Haze values of less than 5% when exposed to fog conditions.

2. The composition of claim 1, wherein the zwitterionic monomers comprise phosphorylcholines, carboxybetaines, and sulfobetaines, or combinations thereof.

3. The composition of claim 2 wherein the zwitterionic monomers comprise N-(3-sulfopropyl)-N-(methacryloxyethyl)-N,N-dimethylammonium betaine, 2-Methacryloyloxyethyl phosphorylcholine, sulfobetaineacrylamide, or carboxybetaine methacrylate, or combinations thereof.

4. The composition of claim 1, wherein the concentration of zwitterionic monomer in the material is greater than 0% and less than 75% by weight.

5. The composition of claim 1, wherein the concentration of zwitterionic monomer in the material is greater than 0% and less than 50% by weight.

6. The composition of claim 1, wherein the concentration of zwitterionic monomer in the material is greater than 0% and less than 25% by weight.

7. The composition of claim 1, wherein the charged monomers further comprise acrylates or methacrylates containing carboxylic acid, sulfonic acid, or quaternary amine functional groups.

8. The composition of claim 1, wherein the charged monomers exhibit hydrophilic properties at pH 2 to 9 or 0 M to 1 M sodium chloride solution.

9. The composition of claim 1, wherein the charged monomers have acidic functionality, basic functionality, or are the salt of a neutralized acid or base.

10. The composition of claim 1, wherein the uncharged hydrophilic monomers comprise vinylpyrrolidone, acrylamide, ethylene glycol containing acrylates or methacrylates, hydroxyethyl methacrylate, vinyl alcohol, vinyl acetate, diethylaminoethyl methacrylate, dimethylaminoethyl acrylate, or other acrylates or methacrylates bearing hydrophilic but uncharged moieties.

11. The composition of claim 1, further comprising at least one crosslinking agent.

12. The composition of claim 11, wherein the at least one crosslinking agent has vinyl groups capable of undergoing free radical polymerization.

13. The composition of claim 12, wherein the at least one crosslinking agent that has vinyl groups capable of undergoing free radical polymerization comprises a multifunctional polyethylene glycol acrylate, or a hydrophilic urethane acrylate.

14. The composition of claim 11, wherein the at least one crosslinking agent has moieties that can react with carboxyl, alcohol, epoxy, carbonyl, or amine functional groups.

15. The composition of claim 14, wherein the moieties that can react with carboxyl, alcohol, epoxy, carbonyl, or amine functional groups comprise carbodiimide, isocyanate, aziderines, oxazoline, amine, hydrazide, silane, epoxy, melamine, and other amino crosslinkers.

16. The composition of claim 1, further comprising at least one photoinitiator that comprises phosphine oxides, phenones, azo initiators, peroxides or benzoyls.

17. The composition of claim 16, wherein said phosphine oxides comprise 2,4,6-Trimethylbenzoyl-diphenyl phosphine oxide, said phenones comprise 2-hydroxy-2-methylpropiophenone or benzophenone, azobisisobutyronitrile, said peroxides comprise benzoyl peroxide, and said benzoyls comprise 2,2-dimethoxy-1,2-diphenyl-ethan-1-one.

18. The composition of claim 1, further comprising at least one additive that aids in adhesion, crosslinking, film-forming, anti-freeze, mechanical or rheological properties of the anti-fog material.

19. The composition of claim 18, wherein the at least one additive that aids in adhesion comprises (3-Aminopropyl) triethoxysilane or polyethylenimine.

20. The composition of claim 18, wherein the at least one additive that aids in anti-freeze properties comprises glycerol, ethylene glycol, propylene glycol, or polyethylene glycol.

21. The composition of claim 18, wherein the at least one additive that aids in mechanical properties comprises at least one nanoparticle or polymer resin.

22. The composition of claim 21, wherein the at least one nanoparticle comprises silica nanoparticles, alumina nanoparticles, cellulose nanoparticles, or other mineral fillers.

23. The composition of claim 21, wherein the at least one polymer resin comprises polyurethane, polyacrylate, polymethacrylate, polystyrene, polyethylene, polypropylene, paraffin wax, natural waxes, or combinations thereof.

24. The composition of claim 18, wherein the at least one additive that aids in film-forming comprises triton, tween, sodium dodecyl sulfate, or cetyl trimethylammonium bromide surfactants, dispersants, styrene maleic acid copolymers, leveling agents, or polyacrylates modified with silicones and/or polyethers.

25. The composition of claim 1, further comprising a carrier solvent comprising water, volatile alcohols, volatile ketones, volatile ethers, and volatile amines.

26. An anti-fog material comprising a zwitterionic-doped hydrogel, said zwitterionic-doped hydrogel comprising:
charged monomeric residues, at least a portion of which comprise zwitterionic monomeric residues;
uncharged hydrophilic monomeric residues; and
at least one crosslinking agent residue,
wherein the anti-fog material exhibits Δ Haze values less than 5% when exposed to fog conditions.

27. A coated article comprising:
a substrate and an anti-fog coating, said anti-fog coating comprising:
a zwitterionic-doped hydrogel, said zwitterionic-doped hydrogel comprising:
charged monomeric residues, at least a portion of which comprise zwitterionic monomeric residues;
uncharged hydrophilic monomeric residues; and at least one crosslinking agent residue, wherein the anti-fog coating exhibits Δ Haze values of less than 5% when exposed to fog conditions.

28. A method of making a surface of a substrate resistant to fogging, said method comprising:
applying to the surface of the substrate a zwitterionic-doped hydrogel comprising:
charged monomeric residues, at least a portion of which comprise zwitterionic monomeric residues;
uncharged hydrophilic monomeric residues; and
at least one crosslinking agent residue, wherein the zwitterionic-doped hydrogel exhibits Δ Haze values of less than 5% when exposed to fog conditions.

* * * * *